United States Patent
Strozier

(10) Patent No.: US 9,332,109 B2
(45) Date of Patent: May 3, 2016

(54) SOFTWARE ROUTINE AND METHODS FOR IMPLEMENTING ROUTINE TO EXTEND TIME TO TRACE A PHONE CALL

(71) Applicant: Scott Alexander Strozier, Houston, TX (US)

(72) Inventor: Scott Alexander Strozier, Houston, TX (US)

(*) Notice: Subject to any disclaimer, the term of this patent is extended or adjusted under 35 U.S.C. 154(b) by 0 days.

(21) Appl. No.: 13/968,351

(22) Filed: Aug. 15, 2013

(65) Prior Publication Data
US 2014/0177814 A1   Jun. 26, 2014

Related U.S. Application Data

(60) Provisional application No. 61/683,310, filed on Aug. 15, 2012.

(51) Int. Cl.
*H04M 3/42* (2006.01)
*H04M 1/725* (2006.01)
*H04M 3/22* (2006.01)

(52) U.S. Cl.
CPC ........ *H04M 1/72525* (2013.01); *H04M 3/2281* (2013.01); *H04M 1/72572* (2013.01)

(58) Field of Classification Search
USPC .......................................... 379/32.05, 201.06
See application file for complete search history.

(56) References Cited

U.S. PATENT DOCUMENTS 8,175,570 B2 * 5/2012 Dickinson .................. 455/404.1
8,238,905 B2 * 8/2012 Jiang ......................... 455/432.1

* cited by examiner

*Primary Examiner* — Quynh Nguyen
(74) *Attorney, Agent, or Firm* — Robert W. Strozier

(57) ABSTRACT

Phone call tracing is a law enforcement tool best known for its use by the Federal Bureau of Investigation in trying to catch kidnappers. Tracing a call is useful for law enforcement and intelligence agencies in order to capture potentially dangerous people. Although useful, tracing a phone call has one drawback: time. It takes time to trace a call. Because of the time it takes to trace a call, the phone is usually hung up or turned off before a trace can be completed. Since there is no way for the trace to be hurried, I propose a phone app that when uploaded to a phone will prevent the phone from disconnecting from the network. This app would upload on the electrical signal carrying the audio and/or video signal. The app will upload into the phone and interfere with the phones ability to terminate the call without indicating that the phone is still connected to the network. With the app downloaded, the app will keep the phone call active so that the trace can then be completed.

8 Claims, 3 Drawing Sheets

SOFTWARE ROUTINE AND METHODS FOR IMPLEMENTING ROUTINE TO EXTEND TIME TO TRACE A PHONE CALL

RELATED APPLICATIONS

This application claims the benefit of and priority to U.S. Provisional Patent Application Ser. No. 61/683,310, filed 15 Aug. 2012 (Aug. 15, 2012).

BACKGROUND OF THE INVENTION

1. Field of the Invention

Embodiments of the present invention relate to software applications and methods for implementing the software applications on a computer (any digital processing unit including a cell phone) for maintaining a phone call by simulating a normal end call function while maintaining the call connection.

More particularly, embodiments of the present invention relate to software applications and methods for implementing the software applications for maintaining a phone call by simulating a normal end call function, where the applications are adapted to be embedded in an audio or audio video stream from a receiver phone to an initiator phone. Once uploaded, the application simulates a normal phone call termination, while maintaining the call. Alternatively, the applications may periodically or intermittently send location information to the receiver phone, without evidencing any phone activity.

2. Description of the Related Art

Tracing a phone call has become a primary tool of the Federal Bureau of Investigation when dealing with kidnapping. A phone call trace can give an exact location of the phone being used by the kidnapper. This gives the FBI a location and they can go in and rescue the person without paying a ransom and without harming the kidnapped person. Although this technique has worked in the past a problem has arisen the people being traced know how to prevent it.

When a trace is being made on a phone it takes time to triangulate the position of the phone especially if it's a cell phone. Experienced kidnappers know this and exploit it by making their demands short and to the point. Without the proper amount of time to track the phone call a trace is impossible. Because of this, tracing the call is becoming more and more ineffective and may be abandoned in the future. This problem affects not only the FBI but all other law enforcement and intelligence agencies in the United States.

Since there is no current practical way to make a phone trace faster, I propose creating a program to assist in the tracking process. The programs or software application or routines, when activated, will upload a cell phone application or app embedded in the audio and/or audio visual electrical signal from a receiver phone to an initiator phone, while a person on the receiver phone is speaking without the recipient's knowledge.

SUMMARY OF THE INVENTION

Embodiments of the present invention provide software applications for maintaining a phone call or phone connection by simulating a normal end call function, where the applications are adapted to be embedded in an audio or audio video stream and uploaded from a receiver phone to an initiator phone. Once uploaded, the applications invade the phones operating system so that the phone is capable of simulating a normal phone call termination function, while maintaining the call or the phone to phone and/or phone to cell tower inter-connections. Alternatively, the applications may terminate the call normally, but periodically or intermittently send location information to the receiver phone, without evidencing any phone activity.

Embodiments of the present invention provide methods implemented on a computer or digital processing unit for implementing the software applications for maintaining a phone call by simulating a normal end call function, where the applications are adapted to be embedded in an audio or audio video stream from a receiver phone to an initiator phone. Once uploaded, the applications invade the operating system of the phone so that the phone is capable of simulating a normal phone call termination function, while maintaining the call and/or the call or the phone to phone and/or phone to cell tower inter-connections. Alternatively, the applications may terminate the call normally, but periodically or intermittently send location information to the receiver phone, without evidencing any phone activity.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventor envisions uploadable phone applications (e.g., uploadable software routines) that are constructed to be secretly uploaded to a target phone during a call initiated by the target phone. The software applications are designed to be embedded within an audio or audio-video signal transmitted from a receiving phone to the target phone after initiation of a connection between the two phones by the initiator phone. Once uploaded, the applications invade the phone's operating system, similar to a computer virus, commandeering the operating system so that the phone is capable of simulating a normal end of call function, while maintaining the inter-phone connection. Alternatively, the applications may normally terminate the call, but cause the phone to periodically or intermittently broadcast location data to the receiving phone without causing any outward evidence that the phone is broadcasting the data. Thus, the uploadable applications will cause the initiator phone to surreptitiously maintain a connection between the initiator phone and the receiver phone by simulating a normal call termination and/or intermittently or periodically transmitting location information to the receiving phone. Once uploaded, the application will change the internal programming of the initiator phone so that when the user terminates the phone call, the phone will evidence externally that the call has been properly terminated, but the phone will maintain the inter-phone connection. By commandeering, changing and/or altering the internal programming code or software of the initiator phone so that all normal phone functions are simulated, the phone will be capable of maintaining an inter-phone connection and/or intermittently or periodically transmits location data to the receiving phone. The applications are capable of simulating termination of call functions, powering down phone functions, powering on phone functions, and/or performing all other normal phone activities without evidence that the phone is under control of an uploaded application that permits the receiver phone to track the initiator phone.

DETAILED DESCRIPTION OF THE DRAWINGS

Figure 1:
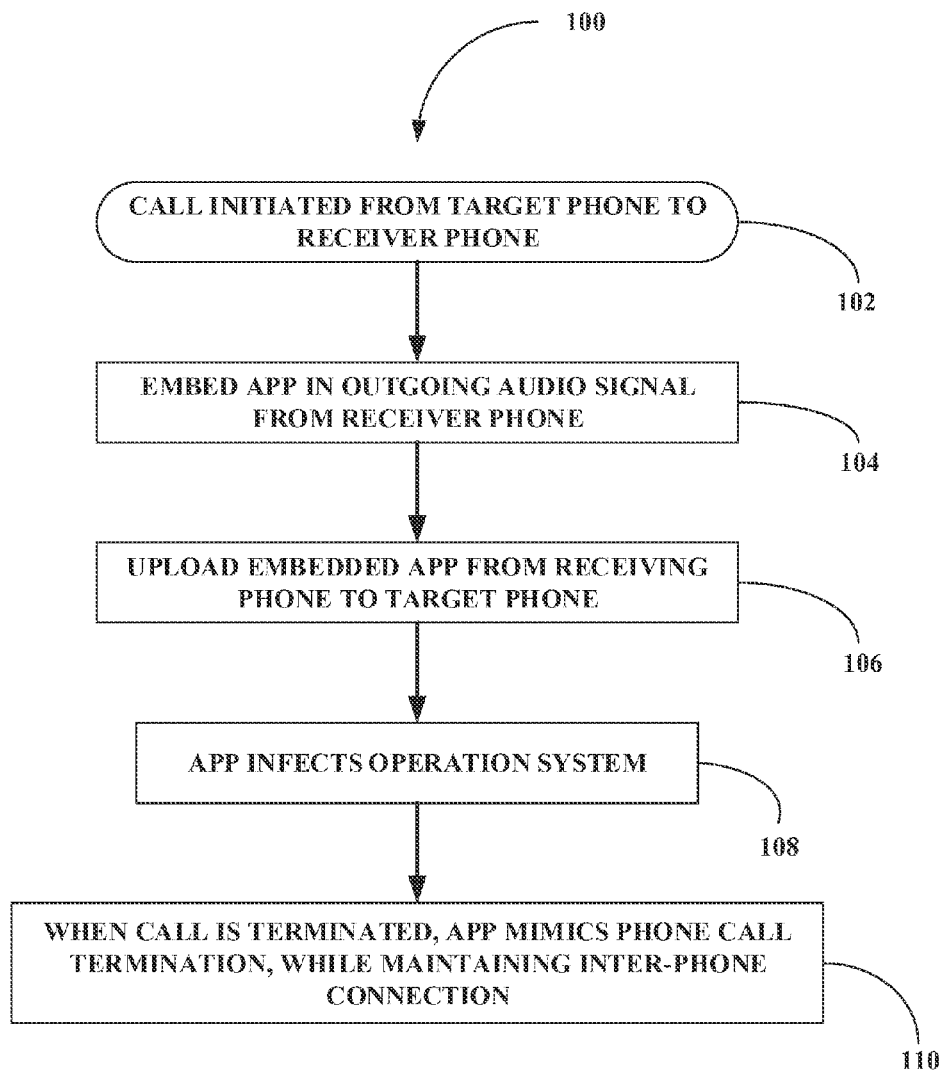
FIG. 1 depicts an embodiment of a method for maintaining a call.

Referring now to FIG. 1, a method for tracking phone calls, generally 100, is shown to include a call initiation step 102, where a target phone initiates a call to a receiver phone concerning an event such as a kidnaping or other incident that requires an accurate phone tracking. The method 100 also includes an embedding step 104, where a phone tracking application is embedded in an audio or audio-video signal from the receiving phone to the target phone once the interphone connection is established and a person on the receiver phone determines that the call needs to be tracked. Once the application is embedded into the signal, the application uploads to the target phone in an upload step 106. Once uploaded, the application infects the phone's operating system so that normal phone operations may be simulated in an infect step 108. When the person using the target phone terminates the call, the method includes a step 110, where the application generates all the outward appearances that the call is terminated, while either maintaining the interconnection between the target phone and the receiver phone so that there is sufficient for the call to be tracked or on an intermittent or periodic basis, sending target phone location data to the receiver phone so that its location may be determined and tracked.

Figure 2:
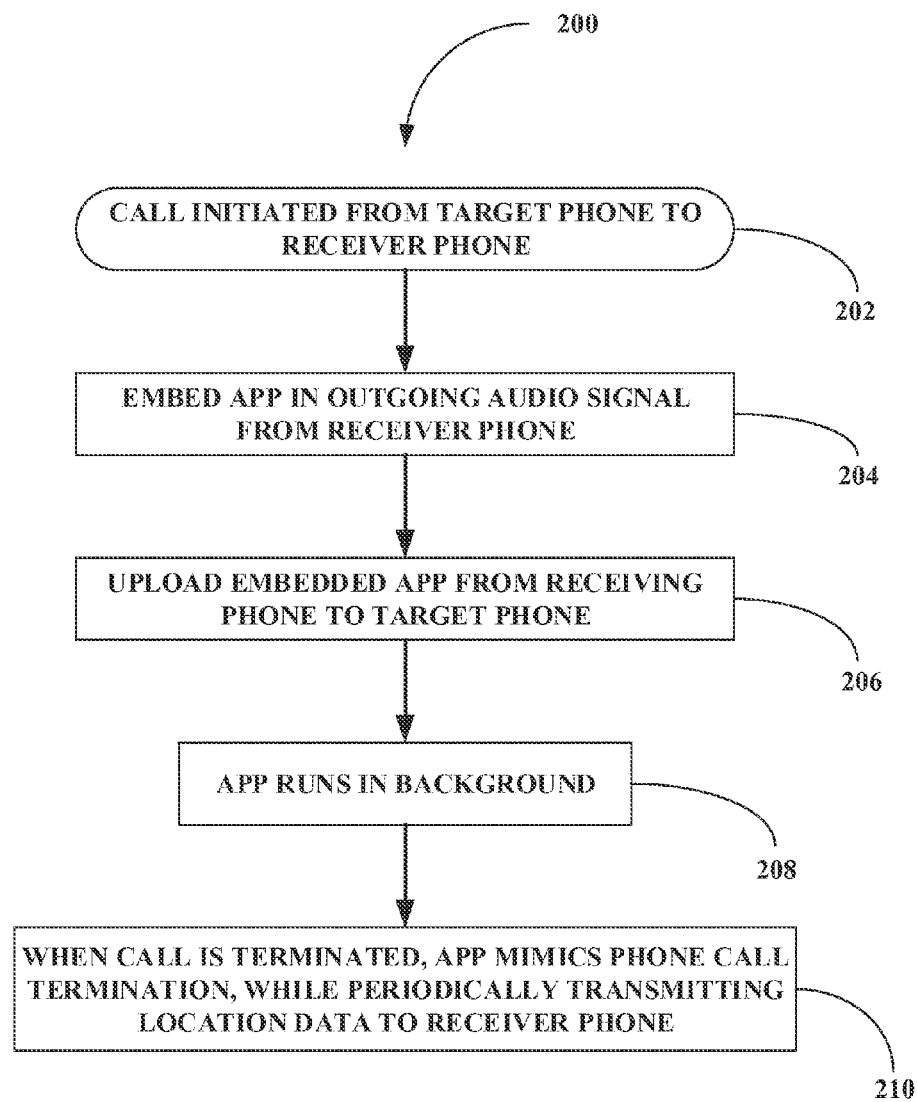
FIG. 2 depicts another embodiment of a method for maintaining a call

Referring now to FIG. 2, a method for tracking phone calls, generally 200, is shown to include a call initiation step 202, where a target phone initiates a call to a receiver phone concerning an event such as a kidnaping or other incident that requires an accurate phone tracking. The method 100 also includes an embedding step 204, where a phone tracking application is embedded in an audio or audio-video signal from the receiving phone to the target phone once the interphone connection is established and a person on the receiver phone determines that the call needs to be tracked. Once the application is embedded into the signal, the application uploads to the target phone in an upload step 206. Once uploaded, the application infects the phone's operating system so that normal phone operations may be simulated in an infect step 208. When the person using the target phone terminates the call, the method includes a step 210, where the application generates all the outward appearances that the call is terminated, while the application periodically transmitting the sending phones location data to the receiver phone applying the trace.

Figure 3:
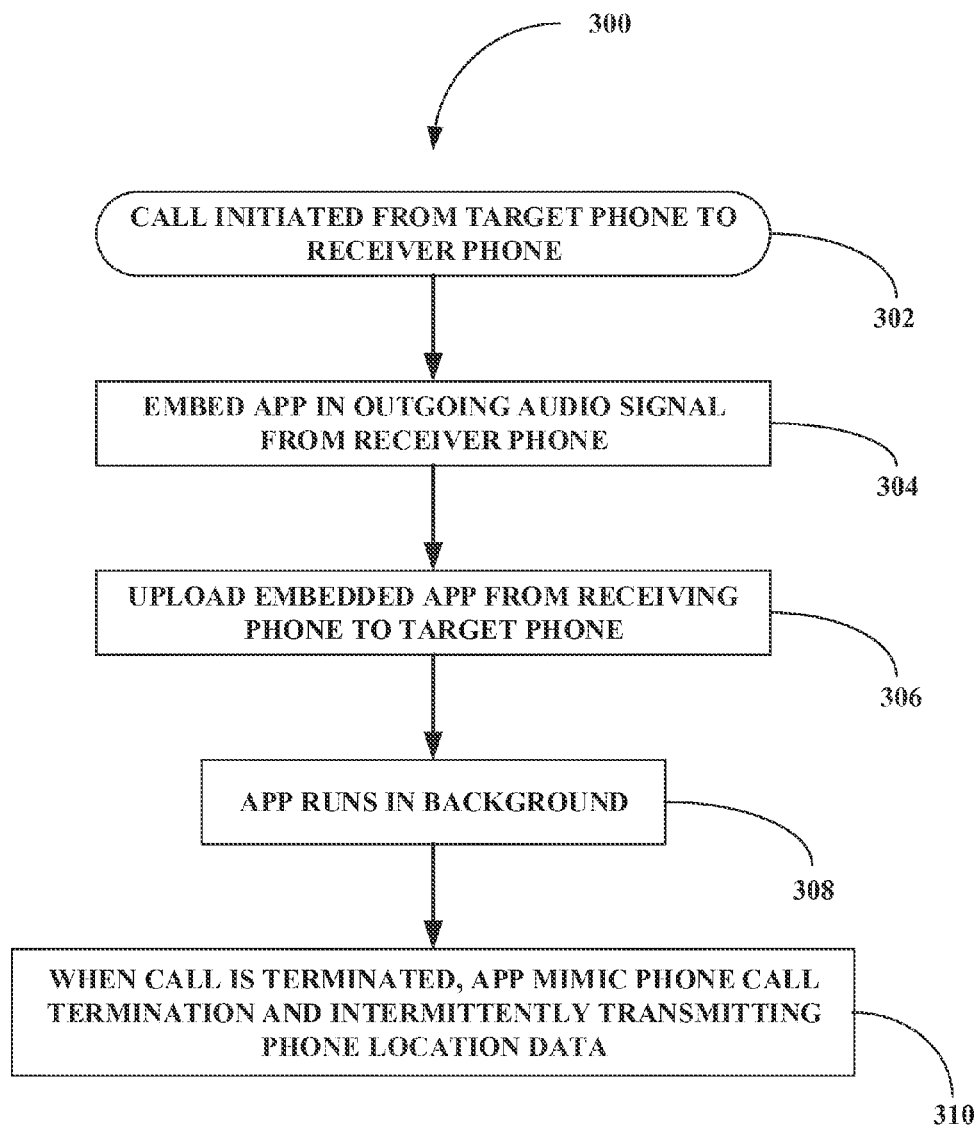
FIG. 3 depicts another embodiment of a method for maintaining a call

Referring now to FIG. 3, a method for tracking phone calls, generally 300, is shown to include a call initiation step 302, where a target phone initiates a call to a receiver phone concerning an event such as a kidnaping or other incident that requires an accurate phone tracking. The method 100 also includes an embedding step 304, where a phone tracking application is embedded in an audio or audio-video signal from the receiving phone to the target phone once the interphone connection is established and a person on the receiver phone determines that the call needs to be tracked. Once the application is embedded into the signal, the application uploads to the target phone in an upload step 306. Once uploaded, the application infects the phone's operating system so that normal phone operations may be simulated in an infect step 308. When the person using the target phone terminates the call, the method includes a step 310, where the application generates all the outward appearances that the call is terminated, while the application intermediately transmitting the location data of the receiver phone to the sending phone initiating the trace.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A system for maintaining a phone call between an initiator phone and a receiver phone by simulating a normal end call function comprising:
a receiver phone including an operating system including a phone tracking application residing in the receiver phone,
an initiator phone including an operating system, and
an interconnection between the receiver phone and the initiator phone in the form a phone call initiated by the initiator phone and received by the receiver phone,
where the receiver phone embeds the phone tracking application in an audio stream, a video stream, or an audio-video stream, upload the phone tracking application from the receiver phone to the initiator phone and invades the initiator phone operating system so that the initiator phone is capable of simulating a normal phone call termination, while maintaining the phone call, without evidencing any phone activity.

2. The system of claim 1, wherein the phone tracking application further periodically or intermittently transmitting location information from the initiator phone to the receiver phone.

3. The system of claim 1, wherein the receiver phone embeds and uploads the phone tracking application when the phone call relates to a kidnapping or other incident that require initiator phone tracking.

4. A system for tracking an initiator phone after a phone call to a receiver phone comprising:
a receiver phone including an operating system including a phone tracking application residing in the receiver phone,
an initiator phone including an operating system, and
an interconnection between the receiver phone and the initiator phone in the form a phone call initiated by the initiator phone and received by the receiver phone,
where the receiver phone embeds the phone tracking application in an audio stream, a video stream, or an audio-video stream, upload the phone application from the receiver phone to the initiator phone and invades the initiator phone operating system so that the initiator phone is capable of periodically or intermittently transmitting location information from the initiator phone to the receiver phone.

5. The system of claim 4, wherein the receiver phone embeds and uploads the phone tracking application when the phone call relates to a kidnapping or other incident that require initiator phone tracking.

6. A method implemented on a receiver phone for uploading a phone tracking application from the receiver phone to an initiator phone to track the initiator phone comprising:
establishing a phone call initiated by the initiator phone including an operating system and received by the receiver phone including an operating system including the phone tracking application, embedding the phone tracking application in an audio stream, a video stream, or an audio video stream on the receiver phone, uploading the phone tracking application from the receive phone to the initiator phone, where the application invades the initiator phone operating system so that the initiator phone operating system is capable of simulating a normal phone call termination, while maintaining the phone call between the initiator phone and the receiver phone, and simulating the normal end call function, while maintaining the call between the initiator phone and the receiver phone, without evidencing any phone activity.

7. The system of claim 6, further comprising:

periodically or intermittently transmitting initiator phone location information to the receiver phone, without evidencing any phone activity.

8. A method implemented on a receiver phone for uploading a phone tracking application from the receiver phone to an initiator phone to track the initiator phone comprising:

establishing a phone call initiated by the initiator phone including an operating system and received by the receiver phone including an operating system including the phone tracking application, embedding the phone tracking application in an audio stream, a video stream, or an audio video stream on the receiver phone, uploading the phone tracking application from the receive phone to the initiator phone, where the application invades the initiator phone operating system so that the initiator phone operating system is capable of periodically or intermittently transmitting initiator phone location information to the receiver phone, without evidencing any phone activity, and periodically or intermittently transmitting initiator phone location information to the receiver phone, without evidencing any phone activity.

* * * * *